(12) United States Patent
Morrow, Jr. et al.

(10) Patent No.: US 11,958,344 B2
(45) Date of Patent: Apr. 16, 2024

(54) VEHICLE DOOR ASSEMBLY

(71) Applicant: NISSAN NORTH AMERICA, INC., Franklin, TN (US)

(72) Inventors: Ronald B. Morrow, Jr., Novi, MI (US); David Kovie, Livonia, MI (US); Robert Russell, Livonia, MI (US)

(73) Assignee: Nissan North America, Inc., Franklin, TN (US)

( * ) Notice: Subject to any disclaimer, the term of this patent is extended or adjusted under 35 U.S.C. 154(b) by 64 days.

(21) Appl. No.: 17/738,881

(22) Filed: May 6, 2022

(65) Prior Publication Data

US 2023/0356574 A1 Nov. 9, 2023

(51) Int. Cl.
*B60J 5/12* (2006.01)
*B60J 5/10* (2006.01)

(52) U.S. Cl.
CPC ............. *B60J 5/12* (2013.01); *B60J 5/103* (2013.01)

(58) Field of Classification Search
CPC ...... B60J 1/1838; B60J 1/1846; B60J 1/1869; B60J 5/101; B60J 5/103; B60J 5/12
USPC .................... 296/51, 146.8, 146.13
See application file for complete search history.

(56) References Cited

U.S. PATENT DOCUMENTS

| | | | |
|---|---|---|---|
| 3,214,213 A * | 10/1965 | Hezler, Jr. | .......... B60J 1/1869 49/40 |
| 3,567,209 A | 3/1971 | Lathers | |
| 3,690,036 A | 9/1972 | Velavicius et al. | |
| 4,620,743 A | 11/1986 | Eke | |
| 5,921,611 A | 7/1999 | Townsend | |
| 6,123,386 A * | 9/2000 | Montone | .......... B60J 5/105 292/336.3 |
| 6,234,563 B1 | 5/2001 | Bascou | |
| 6,386,613 B1 | 5/2002 | Vader | |
| 6,497,448 B1 | 12/2002 | Curtis et al. | |
| 6,634,699 B2 * | 10/2003 | Collins | .......... B60J 5/12 296/147 |
| 6,779,820 B2 | 8/2004 | Ogino | |
| 7,188,863 B2 | 3/2007 | Tiesler et al. | |
| 7,828,366 B2 | 11/2010 | Andre et al. | |
| 8,020,912 B2 * | 9/2011 | Lounds | .......... B60J 5/103 296/76 |
| 8,376,449 B2 | 2/2013 | Kitayama et al. | |

(Continued)

FOREIGN PATENT DOCUMENTS

CN 1590196 A 3/2005
KR 10-0512188 B1 9/2005
(Continued)

*Primary Examiner* — Jason S Daniels
(74) *Attorney, Agent, or Firm* — Global IP Counselors, LLP

(57) ABSTRACT

A vehicle door assembly includes a vehicle body structure defining a door opening, a first door movably connected to the vehicle body structure, and a second door movably connected to the vehicle body structure. The first door is configured to move between closed and open positions. The first door is configured to move in a first direction from the closed position to the open position. The second door is configured to move between closed and open positions. The second door is configured to move in a second direction from the closed position to the open position. The second direction being different from the first direction.

20 Claims, 7 Drawing Sheets

(56) References Cited

U.S. PATENT DOCUMENTS

| | | | |
|---|---|---|---|
| 2005/0253406 A1* | 11/2005 | Faubert | B60J 1/1884 296/51 |
| 2005/0280291 A1* | 12/2005 | Storc | B60J 1/183 296/219 |
| 2008/0127570 A1* | 6/2008 | Andre | B60J 5/101 49/502 |
| 2016/0193903 A1* | 7/2016 | Warburton | E05F 5/12 296/51 |
| 2020/0392779 A1* | 12/2020 | Zhu | B60R 5/041 |

FOREIGN PATENT DOCUMENTS

| | | |
|---|---|---|
| KR | 10-1068172 B1 | 9/2011 |
| WO | 2005/080108 A1 | 9/2005 |
| WO | 2015/097321 A1 | 7/2015 |

\* cited by examiner

VEHICLE DOOR ASSEMBLY

BACKGROUND

Technical Field

The present disclosure generally relates to a vehicle door assembly. More specifically-, the present disclosure relates to a vehicle door assembly that includes a first door and a second door that are movable in different directions from closed to open positions.

Background Information

Many vehicles with rear door openings include a rear door that pivots about horizontally oriented hinges such that the rear door pivots about a horizontal axis between a closed position and an open position. A length and a height of the vehicle are increased when the rear door is in the open position.

Other vehicles with rear door openings include a rear door that pivots about vertically oriented hinges such that the rear door pivots about a vertical axis between a closed position and an open position. A length of the vehicle is increased when the rear door is in the open position.

SUMMARY

An object of the present disclosure is to provide a rear door opening of a vehicle in which a height and length of the vehicle are not increased when a rear door assembly moves from a closed position to an open position.

In view of the state of the known technology, one aspect of the present disclosure is to provide a vehicle door assembly for a vehicle. The vehicle door assembly includes a vehicle body structure defining a door opening, a first door movably connected to the vehicle body structure, and a second door movably connected to the vehicle body structure. The first door is configured to move between closed and open positions. The first door is configured to move in a first direction from the closed position to the open position. The second door is configured to move between closed and open positions. The second door is configured to move in a second direction from the closed position to the open position. The second direction being different from the first direction.

Another aspect of the present disclosure is to provide a vehicle door assembly for a vehicle. The vehicle door assembly includes a vehicle body structure defining a door opening; a first door movably connected to the vehicle body structure, a second door movably connected to the vehicle body structure, a first motor configured to move the first door between the closed and open positions; and a second motor configured to move the second door between the closed and open positions. The first door is configured to move between closed and open positions. The first door is configured to be received between a headliner and a roof panel of the vehicle when the first door is in the open position. The second door is configured to move between closed and open positions. The second door is configured to be received between a cargo floor and a floor panel of the vehicle when the second door is in the open position. The first and second motors are independently controllable.

Also other objects, features, aspects and advantages of the disclosed vehicle door assembly will become apparent to those skilled in the art from the following detailed description, which, taken in conjunction with the annexed drawings, discloses exemplary embodiments of the vehicle door assembly.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
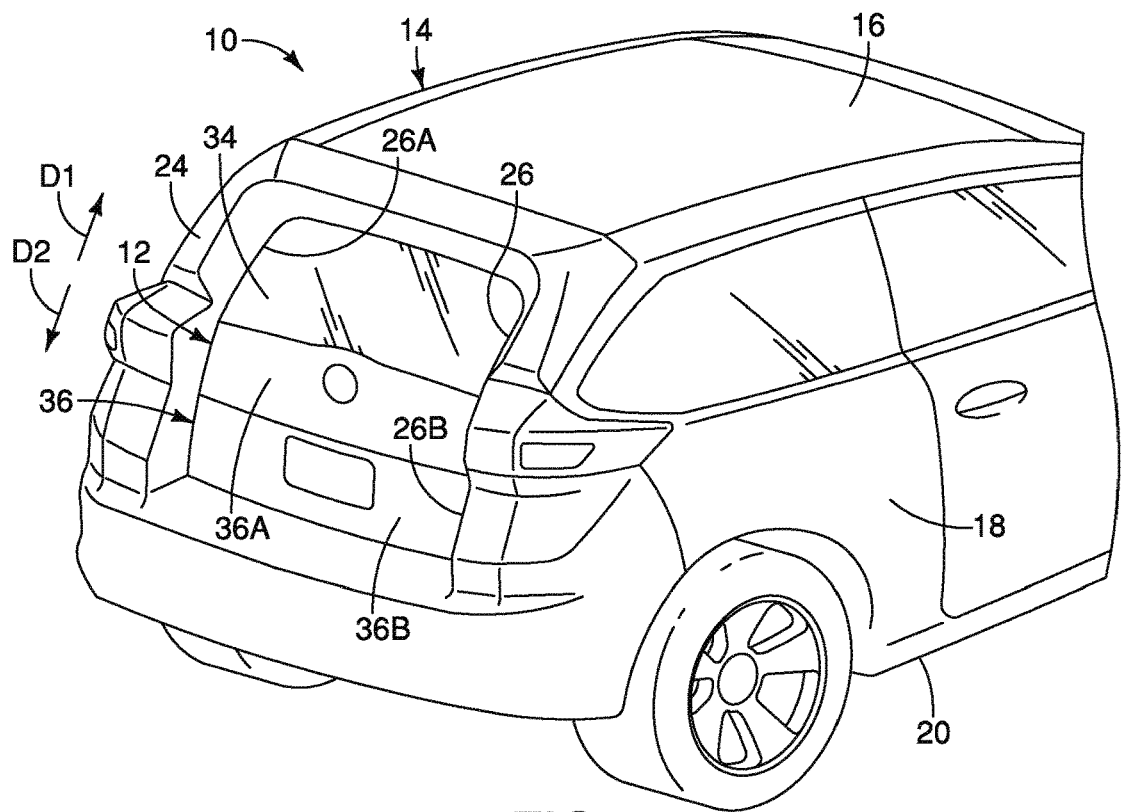
FIG. 1 is a perspective view of a vehicle including a vehicle door assembly in which first and second doors are in closed positions in accordance with an exemplary embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-4, a vehicle 10 having a vehicle door assembly 12 is illustrated in accordance with an exemplary embodiment.

The vehicle 10 has a vehicle body structure 14 that includes at least a roof panel 16, side panels 18, a floor panel 20 defining a cargo/passenger compartment 22 and a rear wall portion 24. The rear wall portion 24 of the body structure 14 defines a door opening 26 that provides access to the cargo/passenger compartment 22. The vehicle body structure 14 further includes a door support assembly 30 referred to hereinafter as the support assembly 30.

The vehicle body structure 14 also includes various additional conventional structures, components and elements that are well known in the art. Since these structures, components and elements are well known in the art, further description is omitted for the sake of brevity.

Figure 2:
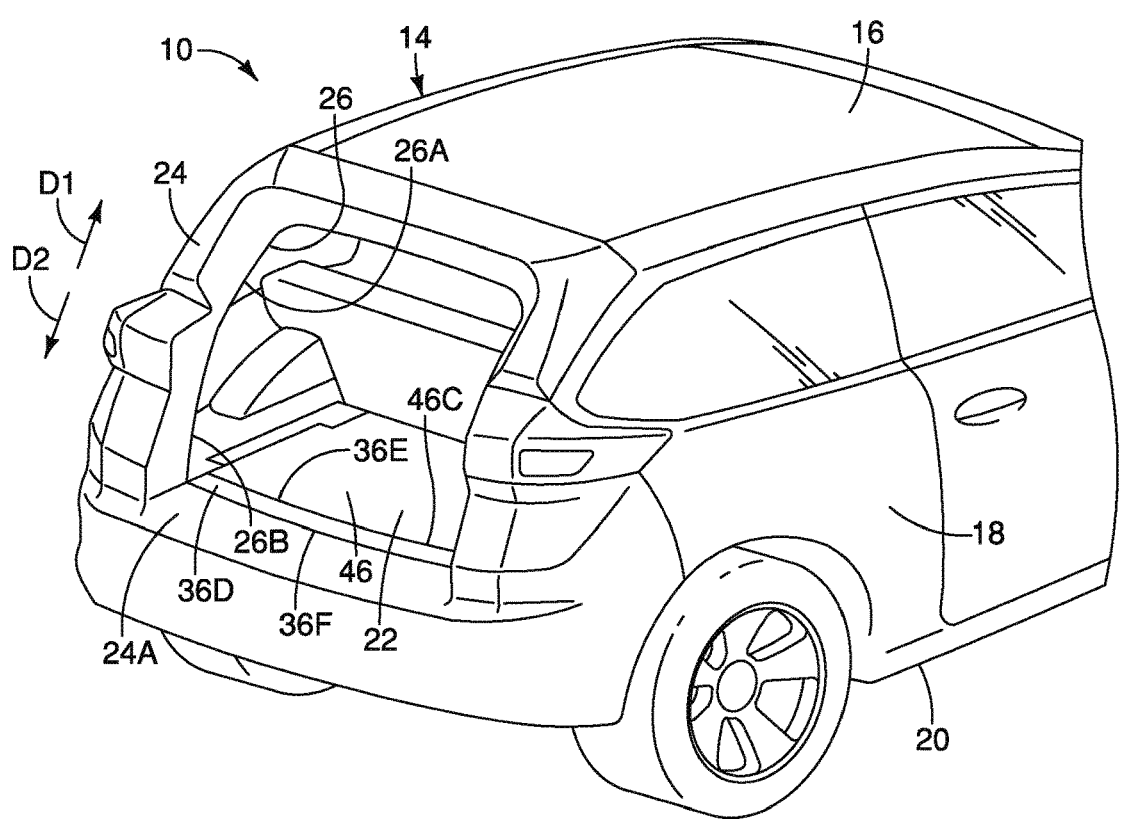
FIG. 2 is a perspective view of the vehicle of FIG. 1 in which the first and second doors are in open positions.
Figure 10:
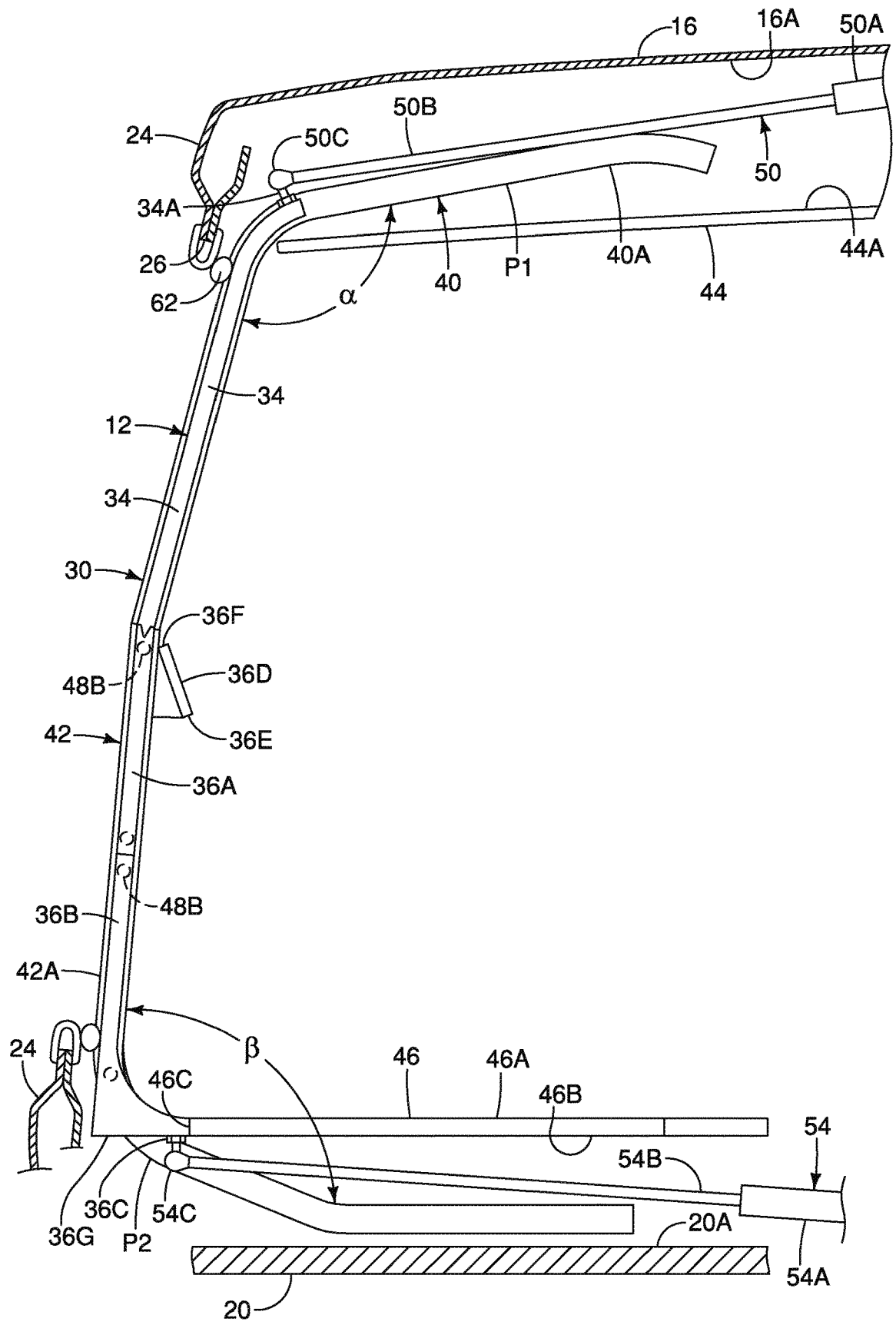
FIG. 10 is an elevational view in cross section of the first and second doors in the closed positions.
Figure 11:
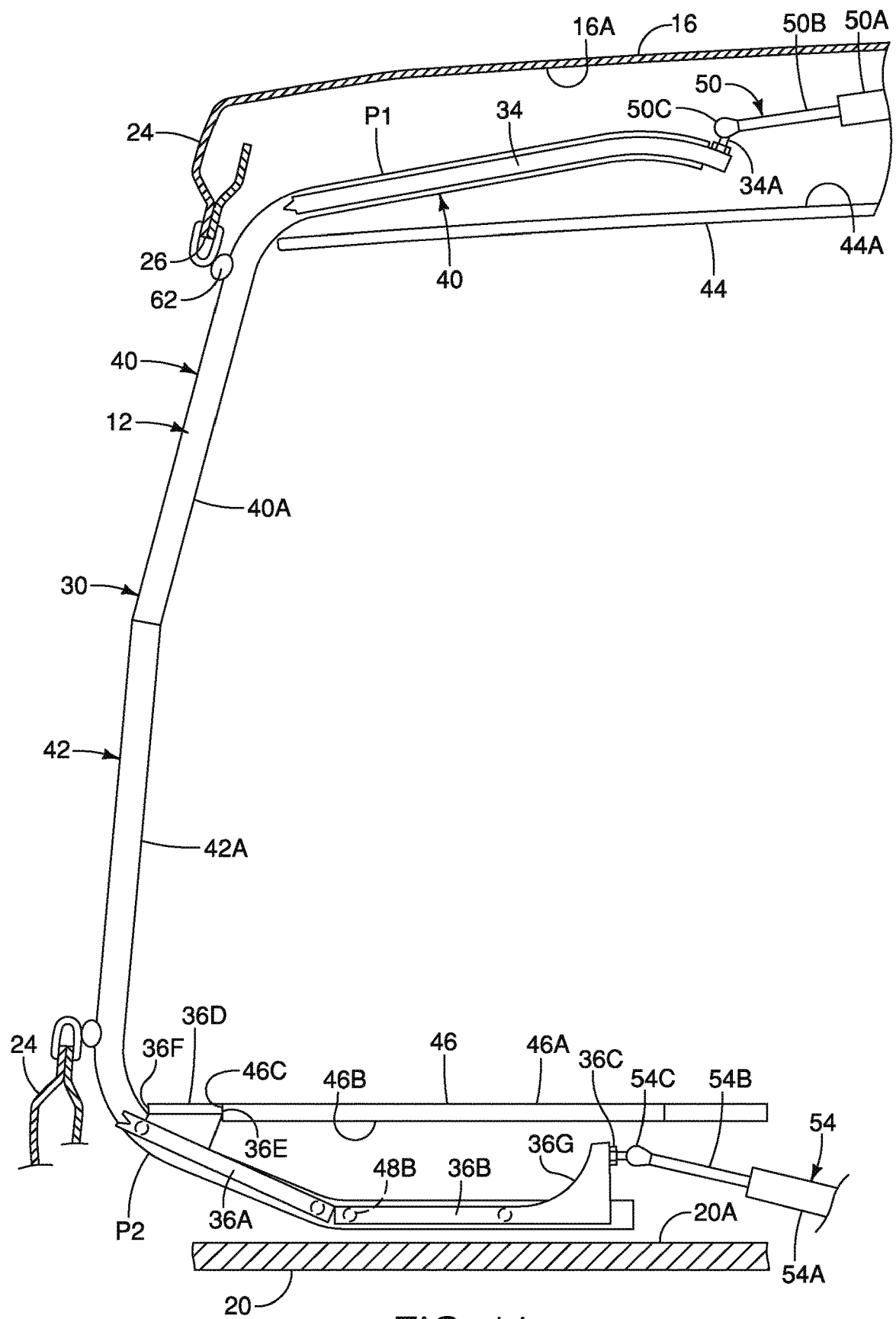
FIG. 11 is an elevational view in cross section of the first and second doors in the open positions.

The vehicle door assembly 12 includes a first door 34 and a second door 36 movably connected to the vehicle body structure 14. The first door 34 and the second door 36 are movable between respective closed positions covering corresponding sections 26A and 26B of the door opening 26, as shown in FIGS. 1 and 10, and respective open positions exposing the corresponding sections 26A and 26B of the door opening 26, as shown in FIGS. 2 and 11. The first door 34 covers an upper section 26A of the door opening 26 when the first door 34 is in the closed position, as shown in FIG. 1. The second door 36 covers a lower section 26B of the door opening 26 when the second door 36 is in the closed position. When the first door 34 and the second door 36 are in the open positions, the first door 34 is separated from and has a non-contacting relationship with the second door 36, as shown in FIG. 2. The sections 26A and 26B of the door opening 26 are uncovered when the first door 34 and the second door 36 are in the open position. The first door 34 is configured to move in a first direction D1 from the closed position to the open position. The second door 36 is configured to move in a second direction D2 from the closed position to the open position. The second direction D2 is a different direction from the first direction D1. A lower end of the first door 36 contacts an upper end of the second door 36 when the first and second doors 34 and 36 are in the closed positions, as shown in FIGS. 2 and 11.

The first door 34 is preferably made entirely of a transparent material, such as, for example, a laminated automotive glass. The second door 36 is made of a non-transparent material, such as a plastic molded wafer panel. The second door 36 can include portions of a panel or an entire panel made of a transparent material, such as a laminated automotive glass. Alternatively, the second door 36 can be made of any suitable material, such as steel, aluminum, magnesium, glass or other suitable material.

As shown in FIG. 1, the second door 36 includes a plurality of panels. The second door 36 includes a first panel 36A and a second panel 36B. The second panel 36B is movably connected to the first panel 36A, such as by a hinge member 38. The second door 36 is shown having two panels 36A and 36B, although the second door 36 can include any suitable number of panels, such as one panel or more than two panels. A plurality of hinge members 38 connect adjacent panels to one another. The panels of the second door 63 include recesses configured to receive vehicle emblems, license plates, lights, or other accessory components.

The support assembly 30 includes a first guide assembly 40 and a second guide assembly 42, as shown in FIG. 10. The first guide assembly 40 includes first and second run channels 40A and 40B configured to movably receive the first door 34. The second guide assembly 42 includes first and second rails 42A and 42B configured to movably receive the second door 36.

The first and second run channels 40A and 40B of the first guide assembly 40 define a first travel path P1 of the first door 34. As shown in FIG. 10, the first door 34 travels along the first travel path P1 between the closed and open positions. The first travel path P1 has a substantially arcuate shape. The first travel path P1 includes an angle α preferably greater than 90 degrees. The first and second run channels 40A and 40B are preferably substantially U-shaped members through which the first door 34 is configured to move.

Figure 8:
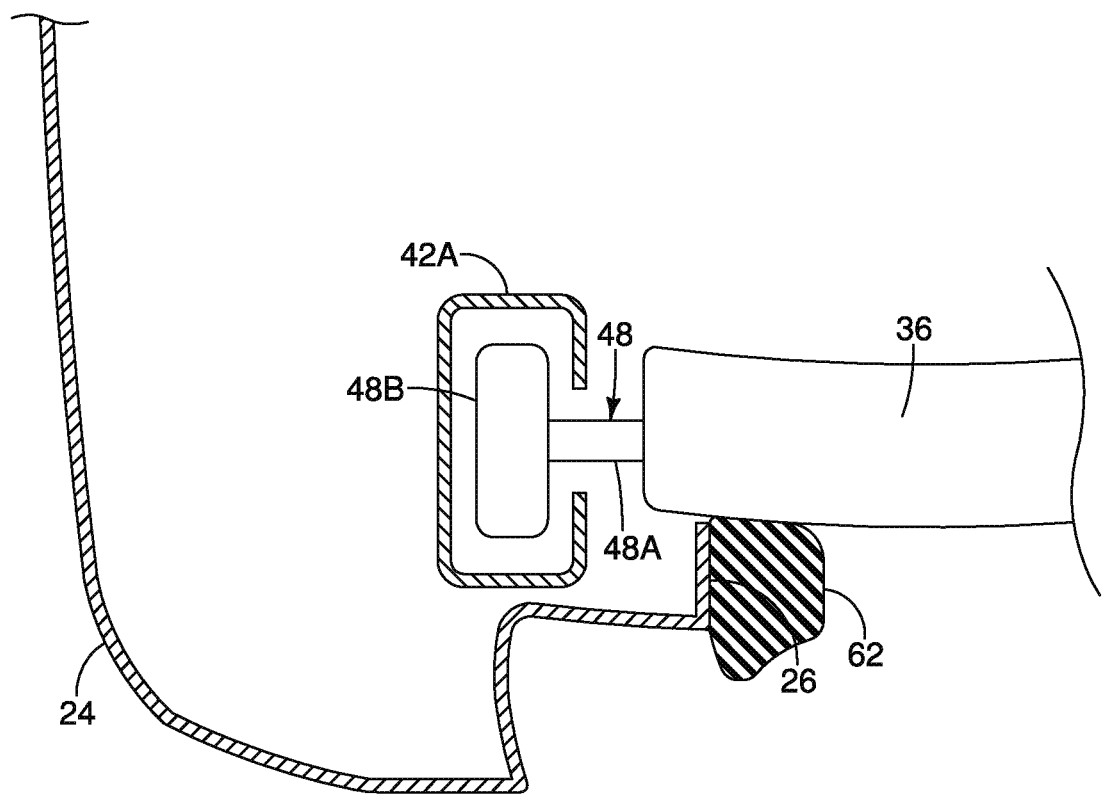
FIG. 8 is a plan view in cross section of a seal member disposed between the second door and the vehicle body structure.

The first and second rails 42A and 42B of the second guide assembly 42 define a second travel path P2 of the second door 36. The second door 36 travels along the second travel path P2 between the closed and open positions. The second travel path P2 includes an angle β of approximately 90 degrees. The shape of the second travel path P2 is different from the shape of the first travel path P1. The first and second rails 42A and 42B are preferably substantially C-shaped members, as shown in FIG. 8, to guide movement of the second door 36.

Figure 3:
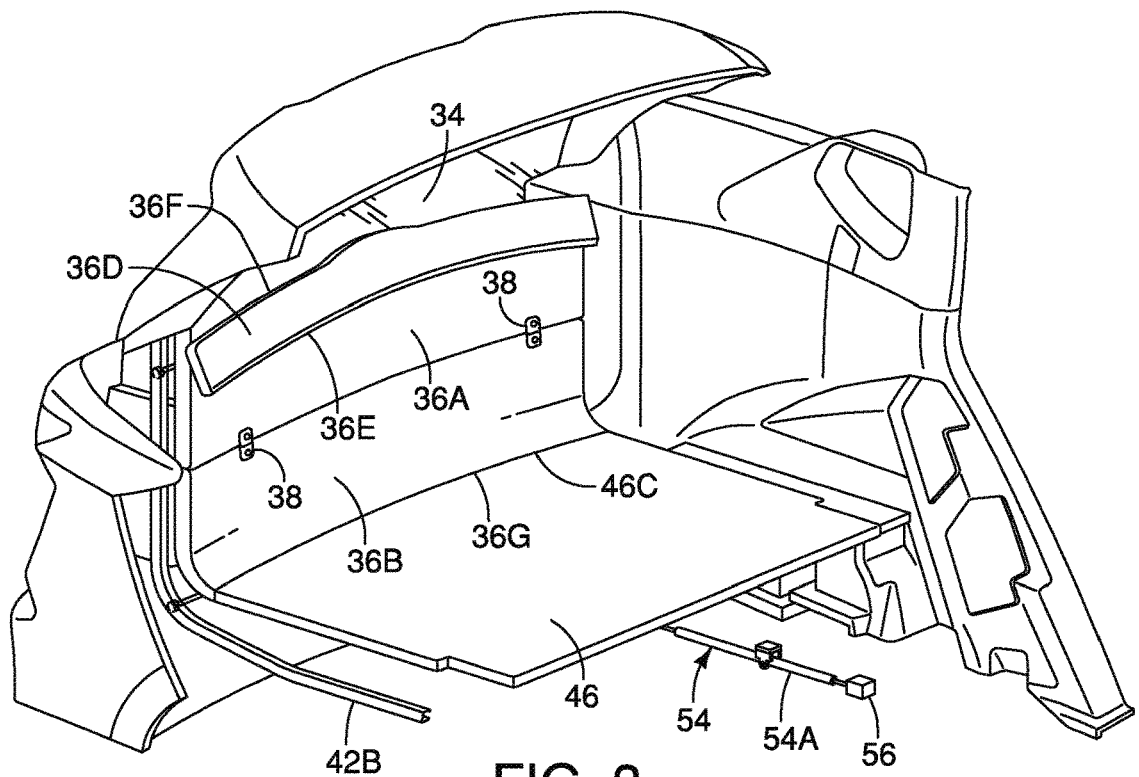
FIG. 3 is a perspective view of the second door of FIG. 1 illustrating a motor for moving the second door between the closed and open positions.

The first and second run channels 40A and 40B of the first guide assembly and the first and second rails 42a and 42b of the second guide assembly 42 are preferably fixed to interior surfaces of the rear wall portion 24 adjacent to respective opposite lateral sides of the door opening 26, as shown in FIG. 3. More specifically, the first run channel 40A and the first rail 42A are attached to the rear wall portion 24 along a driver's side of the door opening 26, and the second run channel 40B and the second rail 42B are attached to the rear wall portion 24 along a passenger's side of the door opening 26. Portions of the first and second guide assemblies 40 and 42 proximate the open positions of the first and second doors 34 and 36 are secured to the roof panel 16 and floor panel 20, respectively, in any suitable manner, such as with brackets.

The first and second run channels 40A and 40B are substantially identical to one another except that they are symmetrical mirror images of one another. The first and second run channels 40A and 40B of the first guide assembly 40 are dimensioned and positioned to support and direct movement of the first door 34 between the closed position (FIGS. 1 and 10) and the open position (FIGS. 2 and 11), and any position therebetween. As shown in FIG. 11, the first door 34 is positioned between a headliner 44 and the roof panel 16 in the open position. The headliner 44 is installed to the side structures 18 and the roof panel 16 in a conventional manner with a gap defined between the roof structure 16 and the headliner 44 at a location adjacent to the rear wall portion 24, as shown in FIG. 11. In other words, the first door 34 is configured to be received between the headliner 44 and the roof panel 16 of the vehicle when the first door 34 is in the open position. The headliner 44 is a conventional vehicle component, such that further description of the headliner 44 is omitted for the sake of brevity.

The first and second rails 42A and 42B are substantially identical to one another except that they are symmetrical mirror images of one another. The first and second rails 42A and 42B of the second guide assembly 42 are dimensioned and positioned to support and direct movement of the second door 36 between the closed position (FIGS. 1 and 10) and the open position (FIGS. 2 and 11), and any position therebetween. As shown in FIG. 11, the second door 36 is positioned between a cargo floor, or floor liner, 46 and the floor panel 20 in the open position. The cargo floor 46 is installed to the side structures 18 and the floor panel 20 in a conventional manner with a gap defined between the floor panel 20 and the cargo floor 46 at a location adjacent to the rear wall portion 24, as shown in FIG. 11. In other words, the second door 36 is configured to be received between the cargo floor 46 and the floor panel 20 of the vehicle 10 when the second door 36 is in the open position. The cargo floor 46 is a conventional vehicle component, such that further description of the cargo floor 46 is omitted for the sake of brevity.

Figure 4:
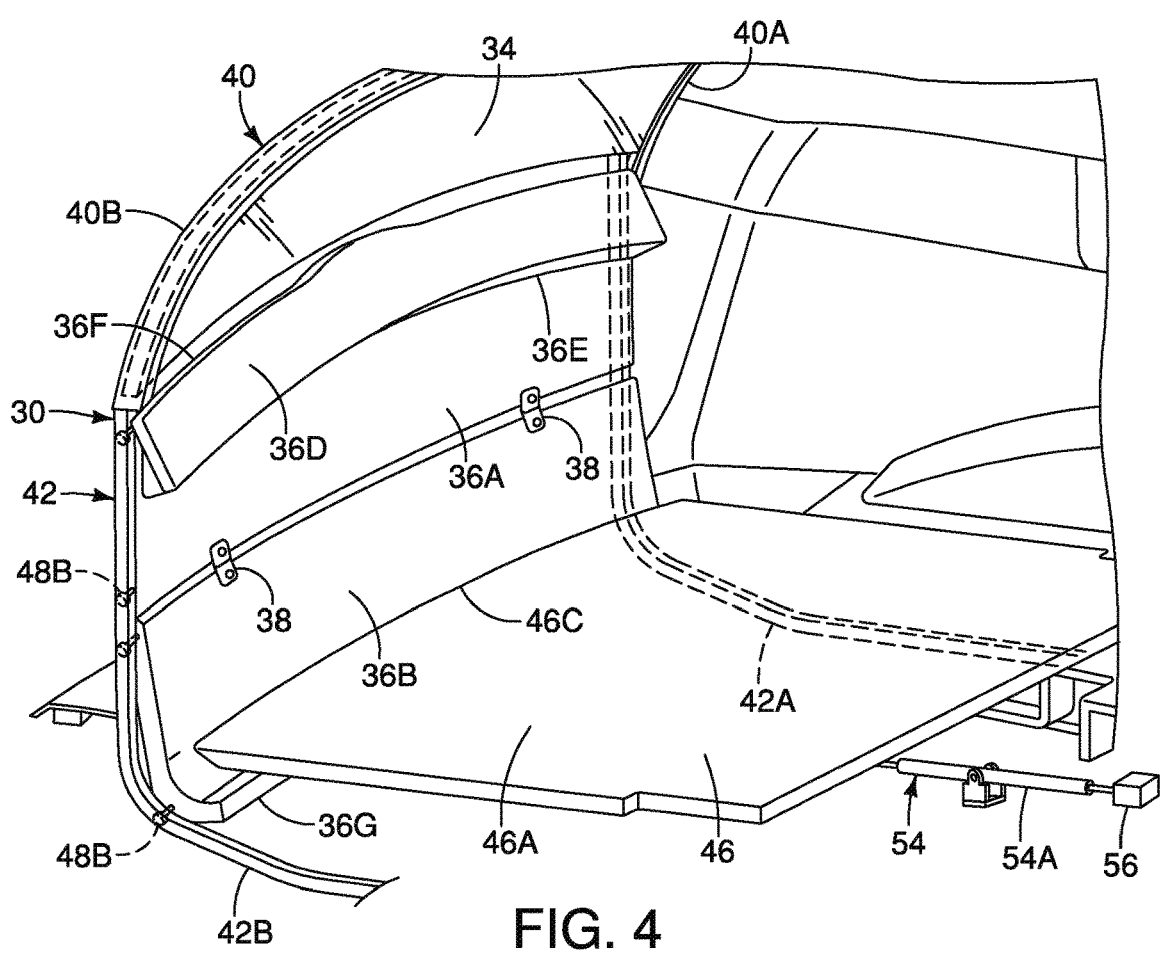
FIG. 4 is a perspective view of a second guide assembly that facilitates movement of the second door between the closed and open positions, the second door moving toward the open position.

The first door 34 is preferably directly received by the first and second run channels 40A and 40B, as shown in FIG. 4. A plurality of door support members 48 movably connect the second door 36 to the first and second rails 42A and 42B, as shown in FIG. 8.

The first and second run channels 40A and 40B are preferably made of a friction free material, such as, for example, polytetrafluoroethylene (PTFE). Alternatively, each of the first and second run channels 40A and 40B can be disposed within a track such that each of the first and second run channels 40A and 40B is retained within the track and allows for movement of the first door 34 through the first and second run channels 40A and 40B. The first run channel 40A is disposed on a driver's side of the first door 34. The second run channel 40B is disposed on the passenger's side of the first door 34. The first and second run channels 40A and 40B are substantially similarly configured.

The second door 36 includes at least two door support members 48, as shown in FIGS. 4 and 8. At least one door support member 48 is disposed on the driver's side of the second door 36 and at least one door support member 48 is disposed on the passenger's side of the second door 36. Preferably, each panel of the second door 36 includes four door support members 48 in which two door support members are disposed on the driver's side and two of the door support members 48 are disposed on the passenger's side. One pair of door support members 48 is disposed near an upper end of each of the panels of the second door 36, and one pair of door support members 48 is disposed near a lower end of each of the panels of the second door 36.

Each of the door support members 48 includes a connecting member 48A and a roller member 48B, as shown in FIG. 8. The connecting member 48A connects the roller member 48B to the second door 36. The connecting member 48A is secured to the second door 36 in any suitable manner. The connecting member 48A extends in a vehicle outboard direction from the second door 36. The roller member 48B is movably connected to an outboard end of the connecting member 48A. As shown in FIG. 8, the roller member 48B is received by the first rail 42A. The first rail 42A is preferably a C-shaped channel. The second rail 42B is similarly configured as the first rail 42A.

Figure 5:
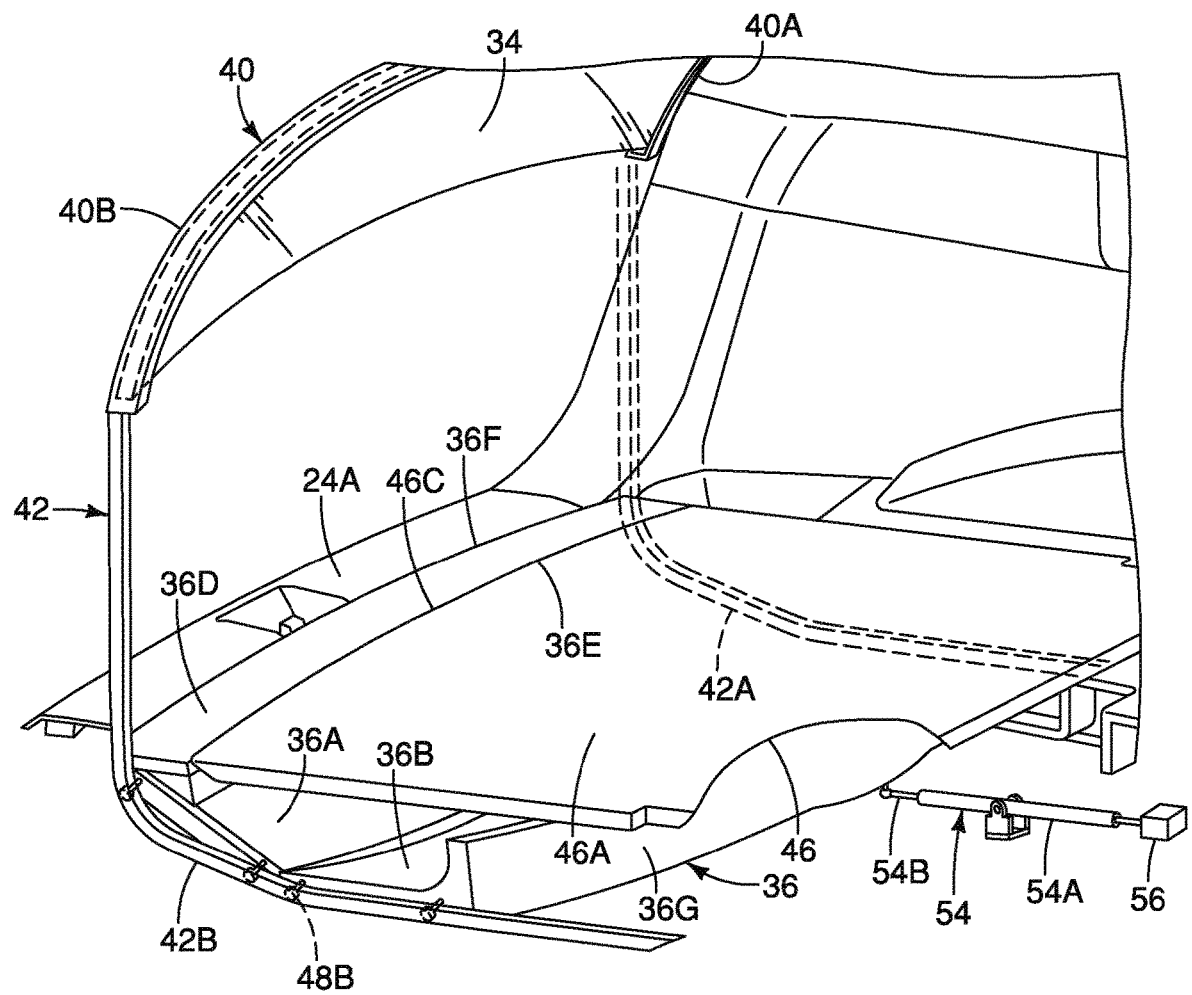
FIG. 5 is a perspective view of the second door of FIG. 4 in the open position.
Figure 6:
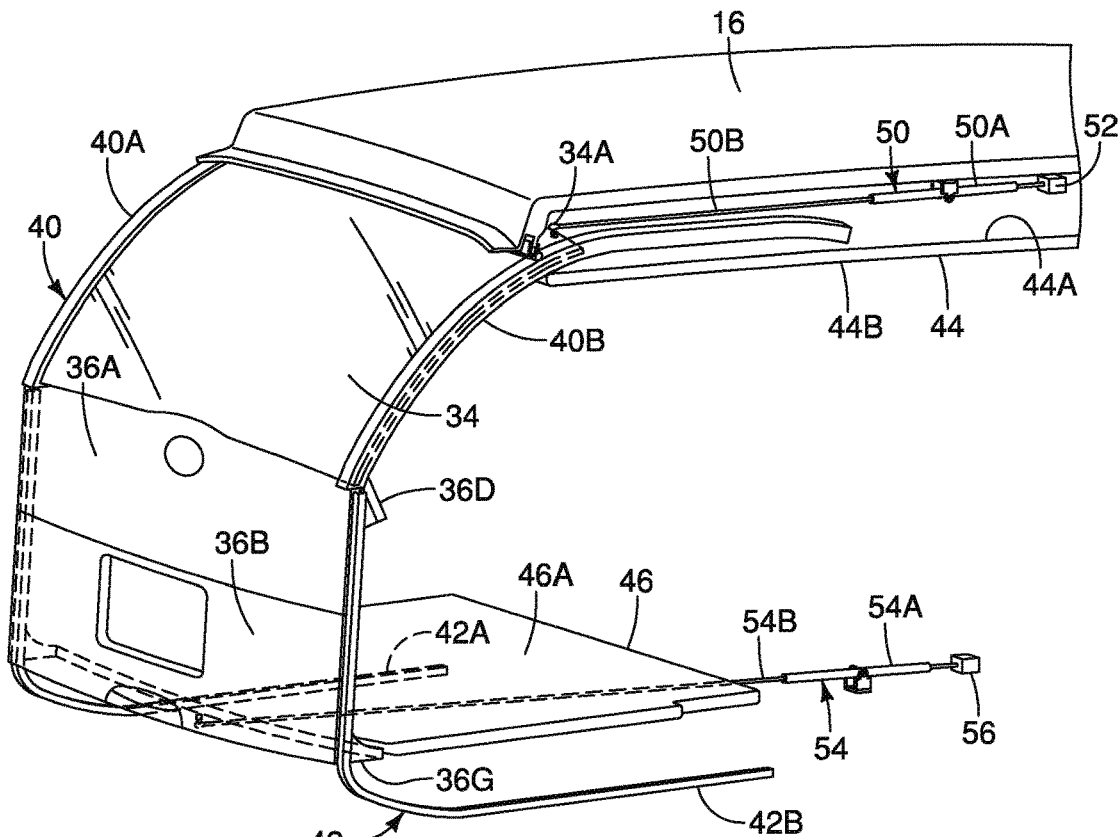
FIG. 6 is a perspective view of a first guide assembly for guiding movement of the first door and a track for guiding movement of the second door, the first and second doors being disposed in the closed positions.
Figure 7:
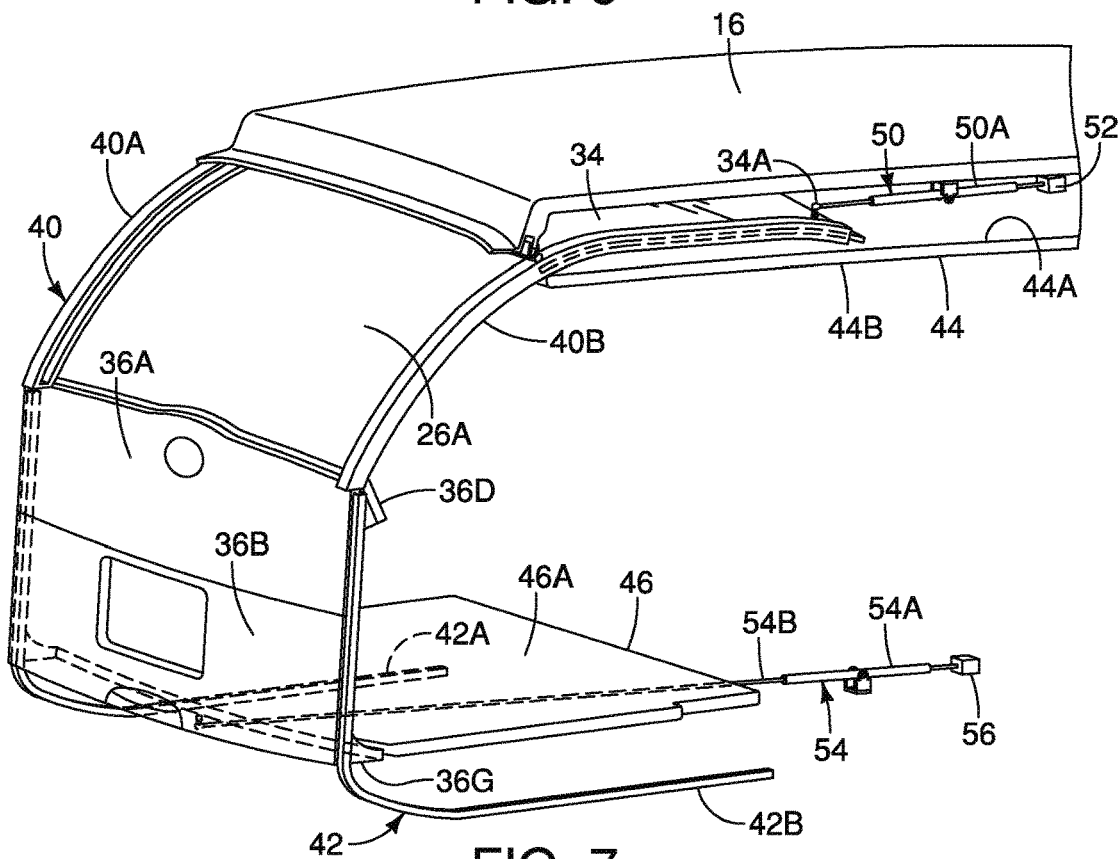
FIG. 7 is a perspective view of the first and second doors of FIG. 6 in which the first door is moved to the open position.

A first spindle assembly 50 is connected to the first door 34 to control movement of the first door 34 between the closed and open positions, as shown in FIGS. 3-7, 10 and 11. The first spindle assembly 50 includes a housing 50A and a shaft 50B. The shaft 50B is movable relative to the housing 50A. A first end 50C of the shaft 50B is connected to the first door 34 in any suitable manner, such as to a connecting member 34A. The connecting member 34A is shown as a ball, although the connecting member 34A can be any suitable structure configured to receive the shaft 50B. A receiving member, such as a socket, corresponding to the connecting member 34A of the first door 34 is disposed at the first end 50C of the shaft 50B to receive the connecting member 34A of the first door 34. As shown in FIGS. 6 and 7, the connecting member 34A and the receiving member of the shaft 50B form a ball and socket joint. Any suitable connection can be used to connect the first door 34 and the shaft 50B of the spindle assembly 50 that allows movement of the shaft 50B relative to the first door 34 when moving the first door 34. A first motor 52 is connected to the first spindle assembly 50 to control movement of the shaft 50B relative to the housing 50A. The first motor 52 is configured to move the first door 34 between the closed position and the open position. When the shaft 50B is fully extended out of the housing 50A the first door 34 is in the closed position. When the shaft 50B is fully retracted in the housing 50A, the first door is in the open position. The shaft 50B can be movably connected to the housing 50A in any suitable manner, such as a threaded connection. The first motor 52 is configured to move the first door 34 to any desired position. The housing 50A and the first motor 52 are preferably connected to the roof panel 16.

A second spindle assembly 54 is connected to the second door 36 to control movement of the second door 36 between the closed and open positions, as shown in FIGS. 3-7, 10 and 11. The second spindle assembly 54 includes a housing 54A and a shaft 54B. The shaft 54B is movable relative to the housing 54A. A first end 54C of the shaft 54B is connected to the second door 36 in any suitable manner, such as to a connecting member 36C. The connecting member 36C is shown as a ball, although the connecting member 36C can be any suitable structure configured to receive the shaft 548. A receiving member, such as a socket, corresponding to the connecting member 36C of the second door 36 is disposed at the first end 54C of the shaft 54B to receive the connecting member 36C of the second door 36. As shown in FIGS. 6 and 7, the connecting member 36C and the receiving member of the shaft 54B form a ball and socket joint. Any suitable connection can be used to connect the second door 36 and the shaft 54B of the spindle assembly 54 that allows movement of the shaft 54B relative to the second door 36 when moving the second door 36. As shown in FIGS. 5, 10 and 11, the first end 54C of the shaft 54B is connected to a lower end of the second panel 36B of the second door 36. A second motor 56 is connected to the second spindle assembly 54 to control movement of the shaft 54B relative to the housing 54A. The second motor 56 is configured to move the second door 36 between the closed position and the open position. When the shaft 54B is fully extended out of the housing 54A, the second door 36 is in the closed position. When the shaft 54B is fully retracted in the housing 54A, the second door 36 is in the open position. The shaft SOB can be movably connected to the housing 50A in any suitable manner, such as a threaded connection. The second motor 56 is configured to move the second door 36 to any desired position. The housing 54A and the second motor 56 are preferably connected to the floor panel 20.

Figure 9:
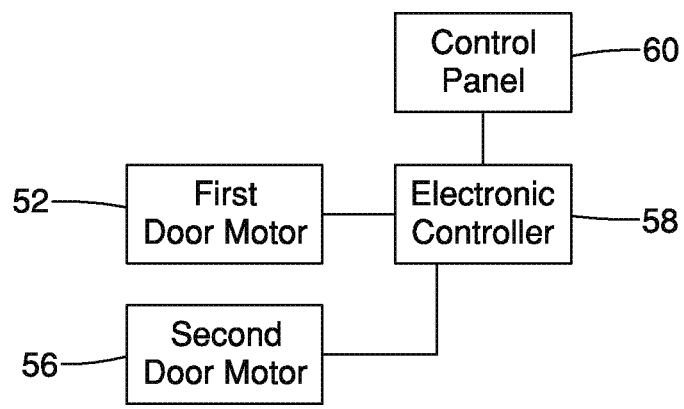
FIG. 9 is a schematic illustration of an electronic controller that controls operation of first and second motors that move the first and second doors, respectively.

As shown in FIG. 9, an electronic controller 58 is disposed in the vehicle body structure 14 of the vehicle 10. The electronic controller 58 is electronically connected to a control panel 60 located on the instrument panel (not shown) of the vehicle 10. The electronic controller 58 is further connected to the first and second motors 52 and 56. The first and second motors 52 and 56 are controlled by the electronic controller 58 for moving the first and second doors 34 and 36, respectively, between the closed and open positions.

The electronic controller 58 receives operating instructions from the control panel 60, as shown in FIG. 9. A vehicle operator or passenger presses a button, rotates a dial, or manipulates a control mechanism of the control panel 60 instructing the electronic controller 58 to move the first and second doors 34 and 36 between the closed positions shown in FIGS. 1 and 10 and the open positions shown in FIGS. 2 and 11, or to any position therebetween. The control panel 60 can additionally be operated or set to instruct the electronic controller 58 to move only the first door 34 between the closed and open positions, or to any other desired position. The control panel 60 can be operated or set to instruct the electronic controller 58 to move only the second door 36 between the closed and open positions, or to any other desired position. The control panel 60 can include separate control mechanisms to control operation of the first and second doors 34 and 36. In other words, the first door 34 and the second door 36 are independently movable to any desired position.

When the electronic controller 58 moves the first door 34 from the closed position to the open position, the first door 34 is received between the headliner 44 and the roof panel 16 of the vehicle body structure 14, as shown in FIGS. 10 and 11. The first door 34 is disposed between an upper surface 44A of the headliner 48 and a lower surface 16A of the roof panel 16. When the electronic controller 58 moves the second door 36 from the closed position to the open position, the second door 36 is received between the cargo floor 46 and the floor panel 20, as shown in FIGS. 10 and 11. The second door 36 is disposed between a lower surface 46B of the cargo floor 46 and an upper surface 20A of the floor panel 20. When either or both of the first and second doors 34 and 36 are moved between the closed and open positions, as shown in FIGS. 10 and 11, a height of the vehicle and a length of the vehicle are not increased. The first and second doors 34 and 36 do not require additional space to move between open and closed positions, such that the first and second doors 34 and 36 can be operated in areas, such as a garage, in which space is limited. A person in the vicinity of the rear of the vehicle 10 is not contacted by either the first or second door 34 and 36 moving between closed and open positions because the length of the vehicle is not increased by operation of the first and second doors 34 and 36.

When the electronic controller 58 operates the first and second motors 52 and 56, the first and second motors 52 and 56 are configured to move the first door 34 and the second door 36 to predetermined positions. The first and second motors 52 and 56 can be stepper motors or any other suitable motor that provides precise movement of the first and second doors 34 and 36 responsive to operation of controls of the control panel 60. A locking member (not shown) can be connected to each of the first and second doors 34 and 36 to secure the first and second doors in a desired position. The locking members are controllable by the electronic controller 58 to release the first and second doors 34 and 36 for movement, and to lock the first and second doors to prevent movement from a desired position.

The electronic controller 58 preferably includes a microcomputer with a door control program that controls the first and second motors 52 and 56. The electronic controller 58 can also include other conventional components such as an input interface circuit, an output interface circuit, and storage devices such as a ROM (Read Only Memory) device and a RAM (Random Access Memory)) device. The electronic controller 58 is operatively coupled to the first and second motors 52 and 56, and the control panel 60 in a conventional manner. The electronic controller 58 can further be connected to various door position and door position sensors (not shown) that provide the electronic controller 58 with positioning and orientation data of each of the doors of the vehicle door assembly 12. The internal RAM of the electronic controller 58 stores statuses of operational flags and various control data such as door positioning and door orientation data correlated to the output of the sensors (not shown) and positioning and orientation data of each of the doors. The internal ROM of the electronic controller 58 stores data and motor interface data of the door assembly 12 for various operations. The electronic controller 58 is capable of selectively controlling any of the components of the door assembly 12 in accordance with the stored control program.

The rear wall portion 24 includes a seal member 62 that is installed along an interior surface of the rear wall portion 24 adjacent to the door opening 26. More specifically, the seal member 62 surrounds the door opening 26 such that with the first door 34 and the second door 36 in their respective closed positions, the first and second doors 34 and 36 contact corresponding portions of the seal creating a water seal between the first and second doors 34 and 36 and the rear wall portion 24. The cross-sectional views in FIG. 8 illustrates contact between the seal member 62 and the second door 36. Similar contact is established between the first door 34 and the seal member. The seal member 62 preferably extends completely around the door opening 26 extending along top, bottom and lateral sides of the door opening 26.

A seal member (not shown) can be connected to a bottom outer portion of the first door 34 or to an upper outer portion of the second door 36 to create a seal between the first and second doors 34 and 36 in their respective closed positions, as shown in FIGS. 1 and 10. Another seal member (not shown) can be connected to a bottom inner portion of the first door 34 or to an upper inner portion of the second door 36 to create a seal between the first and second doors 34 and 36 in their respective closed positions, as shown in FIGS. 1 and 10. These seal members can be integrally formed as a one-piece seal member connected to either the first door 34 or the second door 36 to create a seal therebetween when the first and second doors 34 and 36 are in the closed positions shown in FIGS. 1 and 10.

The second door 36 includes an inwardly extending lip 36D, as shown in FIGS. 3 and 4. The lip 36D is connected to the first panel 36A of the first door 36. Alternatively, the lip 36 can be integrally formed with the first panel 36A. The lip 36D is configured to contact a rear end 46C of the cargo floor 46 when the second door 36 is in the open position, as shown in FIGS. 2, 5 and 11. The lip 36D has a lower surface 36E and an upper surface 36F, as shown in FIGS. 3 and 4. The lower surface 36E of the lip 36D contacts the rear end 46C of the cargo floor 46 when the second door is in the open position, as shown in FIGS. 2, 5 and 11. The upper surface 36F of the lip 36D contacts a lower surface 24A of the rear wall portion 24 of the vehicle body structure 14. The lip 36D extends from the rear end of the cargo floor 46 to the vehicle body structure 14 in a longitudinal direction of the vehicle 10 when the second door 36 is in the open position, as shown in FIG. 2. The lip 36D of the second door 36 provides a smooth transition between the cargo floor 46 and the lower surface 24A of the rear wall portion 24 when the second door 36 is in the open position. In other words, the lip 36D, the lower surface 24A of the rear wall portion 24, and the cargo floor 46 are substantially planar. A lower end 36G of the second door 36 contacts the rear end 46C of the cargo floor 46 when the second door 36 is in the closed position, as shown in FIGS. 3, 6, 7 and 10.

The various vehicle features and components other than those of the door assembly 12 are conventional components that are well known in the art. Since these vehicle features and components are well known in the art, these structures will not be discussed or illustrated in detail herein. Rather, it will be apparent to those skilled in the art from this disclosure that the components can be any type of structure and/or programming that can be used to early out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to can out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
   a vehicle body structure defining a door opening;
   a first door movably connected to the vehicle body structure, the first door being configured to move between closed and open positions, the first door being configured to move in a first direction from the closed position to the open position; and
   a second door movably connected to the vehicle body structure, the second door being configured to move between closed and open positions, the second door being configured to move in a second direction from the closed position to the open position, the second direction being different from the first direction, the second door being configured to be received between a cargo floor and a floor panel of the vehicle when the second door is disposed in the open position,
   the second door including an inwardly extending lip, the lip being configured to contact a rear end of the cargo floor when the second door is in the open position.

2. The vehicle door assembly according to claim 1, wherein
   the first door is configured to be received between a headliner and a roof panel of the vehicle when the first door is disposed in the open position.

3. The vehicle door assembly according to claim 1, wherein
   the first door and the second door are independently movable.

4. The vehicle door assembly according to claim 1, wherein
   the first door is made of a transparent material.

5. The vehicle door assembly according to claim 1, wherein
   the second door includes a plurality of panels.

6. The vehicle door assembly according to claim 1, wherein
   the first door travels along a first travel path between the closed and open positions, the first travel path having a substantially arcuate shape.

7. The vehicle door assembly according to claim 6, wherein
   the second door travels along a second path between the closed and open positions, the second travel path having an angle of approximately 90 degrees.

8. The vehicle door assembly according to claim 7, wherein
   the shape of the second travel path is different from the shape of the first travel path.

9. The vehicle door assembly according to claim 1, wherein
   the lip extends from the rear end of the cargo floor to the vehicle body structure in a longitudinal direction of the vehicle when the second door is in the open position.

10. The vehicle door assembly according to claim 1, wherein
    a lower end of the first door contacts an upper end of the second door when the first and second doors are in the closed positions.

11. The vehicle door assembly according to claim 1, wherein
    a height of the vehicle is not increased when the first and second doors are disposed in the open positions.

12. The vehicle door assembly according to claim 1, wherein
    a length of the vehicle is not increased when the first and second doors are disposed in the open positions.

13. A vehicle door assembly, comprising:
    a vehicle body structure defining a door opening;
    a first door movably connected to the vehicle body structure, the first door being configured to move between closed and open positions, the first door being configured to be received between a headliner and a roof panel of the vehicle when the first door is in the open position;
    a second door movably connected to the vehicle body structure, the second door being configured to move between closed and open positions, the second door being configured to be received between a cargo floor and a floor panel of the vehicle when the second door is in the open position;
    a first motor configured to move the first door between the closed and open positions; and
    a second motor configured to move the second door between the closed and open positions, the first and second motors being independently controllable.

14. The vehicle door assembly according to claim 13, wherein
the first door travels along a first travel path between the closed and open positions, the first travel path having a substantially arcuate shape.

15. The vehicle door assembly according to claim 14, wherein
the second door travels along a second path between the closed and open positions, the second travel path having an angle of approximately 90 degrees.

16. The vehicle door assembly according to claim 15, wherein
the shape of the second travel path is different from the shape of the first travel path.

17. The vehicle door assembly according to claim 13, wherein
the second door includes an inwardly extending lip, the lip being configured to contact a rear end of the cargo floor when the second door is in the open position.

18. The vehicle door assembly according to claim 17, wherein
the lip extends from the rear end of the floor liner to the vehicle body structure in a longitudinal direction of the vehicle when the second door is in the open position.

19. A vehicle door assembly, comprising:
a vehicle body structure defining a door opening;
a first door movably connected to the vehicle body structure, the first door being configured to move between closed and open positions, the first door being configured to move in a first direction from the closed position to the open position; and
a second door movably connected to the vehicle body structure, the second door being configured to move between closed and open positions, the second door being configured to move in a second direction from the closed position to the open position, the second direction being different from the first direction,
the second door including a plurality of panels, each of the plurality of panels being movably connected to an adjacent panel, and
a length of the vehicle not being increased when the first and second doors are disposed in the open positions.

20. The vehicle door assembly according to claim 19, wherein
each of the plurality of panels is connected to the adjacent panel by a hinge member.

\* \* \* \* \*